United States Patent
Choi

(10) Patent No.: US 12,485,926 B2
(45) Date of Patent: Dec. 2, 2025

(54) AUTONOMOUS DRIVING CONTROL APPARATUS AND METHOD FOR GENERATING ROUTE THEREOF

(71) Applicants: Hyundai Motor Company, Seoul (KR); Kia Corporation, Seoul (KR)

(72) Inventor: Su Young Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 90 days.

(21) Appl. No.: 18/355,661

(22) Filed: Jul. 20, 2023

(65) Prior Publication Data

US 2024/0140488 A1    May 2, 2024

(30) Foreign Application Priority Data

Oct. 28, 2022 (KR) .................. 10-2022-0141586

(51) Int. Cl.
  *G01C 22/00* (2006.01)
  *B60W 40/12* (2012.01)
  *B60W 60/00* (2020.01)

(52) U.S. Cl.
  CPC ........ *B60W 60/0018* (2020.02); *B60W 40/12* (2013.01); *B60W 2554/801* (2020.02); *B60W 2556/35* (2020.02); *B60W 2556/40* (2020.02)

(58) Field of Classification Search
  CPC ............. B60W 60/0018; B60W 40/12; B60W 2556/40; B60W 2556/35; B60W 2554/801; B60W 30/12; B60W 30/16; B60W 30/162; B60W 30/165; B60W 30/17; B60W 30/182; B60W 50/082; B60W 2554/00; B60W 2554/80; B60W 2554/803; B60W 2555/60; B60K 28/00; B60K 28/165; B60K 2028/003; B60K 2028/006; B60K 28/02; B60K 28/04; B60K 28/06; B60K 28/063; B60K 28/066; B60K 28/08; B60K 28/10; B60K 28/12; B60K 28/14; B60K 28/16; G05D 1/0061; G05D 1/0088; G05D 1/021; G05D 1/0214; G05D 1/0221; G05D 1/0223
  USPC ............................................ 701/23, 25, 431
  See application file for complete search history.

(56) References Cited

U.S. PATENT DOCUMENTS

| | | | |
|---|---|---|---|
| 2012/0200431 A1* | 8/2012 | Ross .................. | G08G 1/04 340/936 |
| 2014/0244151 A1* | 8/2014 | Matsubara ............ | B60W 10/20 701/301 |
| 2018/0188045 A1* | 7/2018 | Wheeler ................ | G06V 10/98 |
| 2019/0005812 A1* | 1/2019 | Matus .................. | G06V 20/584 |
| 2019/0078896 A1* | 3/2019 | Zhu ...................... | G08G 1/0112 |
| 2019/0182467 A1* | 6/2019 | Hamilton ............... | H04N 13/00 |
| 2020/0310450 A1* | 10/2020 | Reschka ............... | G05D 1/0088 |
| 2020/0401823 A1* | 12/2020 | Miller .................. | G01C 21/3811 |

(Continued)

*Primary Examiner* — Manglesh M Patel
(74) *Attorney, Agent, or Firm* — Slater Matsil, LLP

(57) ABSTRACT

In an embodiment an autonomous driving control apparatus includes a memory configured to store high definition map information and a processor electrically connected to the memory, wherein the processor is configured to generate a grid map based on a first driving route in an intersection included in the high definition map information based on a detected moving object and on the first driving route of the vehicle, to determine a drivable area with regard to the moving object and to generate a second driving route in the drivable area based on the grid map.

17 Claims, 15 Drawing Sheets

(56) References Cited

U.S. PATENT DOCUMENTS

| | | | |
|---|---|---|---|
| 2021/0004613 A1* | 1/2021 | Yang | G06V 20/56 |
| 2021/0107402 A1* | 4/2021 | Lee | B60Q 9/008 |
| 2021/0107514 A1* | 4/2021 | Watanabe | B60W 30/18163 |
| 2021/0131823 A1* | 5/2021 | Giorgio | G01S 17/931 |
| 2021/0262808 A1* | 8/2021 | Wang | G06V 20/588 |
| 2021/0339765 A1* | 11/2021 | Ichinose | G06T 7/11 |
| 2022/0081002 A1* | 3/2022 | Xiao | B60W 60/00272 |
| 2022/0412770 A1* | 12/2022 | Li | G01C 21/3807 |
| 2023/0391358 A1* | 12/2023 | Donderici | G06V 20/584 |
| 2024/0132112 A1* | 4/2024 | Afshar | B60W 60/00272 |
| 2024/0157976 A1* | 5/2024 | Heo | B60W 60/0016 |
| 2024/0190475 A1* | 6/2024 | Hamada | B60W 60/0027 |
| 2024/0217559 A1* | 7/2024 | Qi | B60W 60/0015 |
| 2024/0308506 A1* | 9/2024 | Quirynen | B60W 30/14 |
| 2024/0310846 A1* | 9/2024 | Jeon | G05D 1/644 |

\* cited by examiner

- - - : ROUTE BASED ON HIGH DEFINITION MAP
——— : DRIVING ROUTE
—·— : BOUNDARY OF DRIVABLE AREA
▨ : MOVING OBJECT

AUTONOMOUS DRIVING CONTROL APPARATUS AND METHOD FOR GENERATING ROUTE THEREOF

CROSS-REFERENCE TO RELATED APPLICATIONS

This application claims the benefit of priority to Korean Patent Application No. 10-2022-0141586, filed in the Korean Intellectual Property Office on Oct. 28, 2022, the entire contents of which are incorporated herein by reference.

TECHNICAL FIELD

The present disclosure relates to an autonomous driving control apparatus and a method for generating a route thereof.

BACKGROUND

An autonomous vehicle may automatically travel to a destination desired by a passenger in a downtown area as well as a highway. There is an intersection section which is controlled by traffic lights and has much traffic in the downtown area. A moving violation situation (e.g. tailgate) frequently occurs during congested traffic hours, such as a commuting time. When the moving violation situation occurs when the autonomous vehicle is able to travel, the autonomous vehicle should avoid a moving violation object to travel to a target point.

SUMMARY

Embodiments solve the above-mentioned problems occurring in the prior art while advantages achieved by the prior art are maintained intact.

An embodiment of the present disclosure provides an autonomous driving control apparatus for generating a route for avoiding a moving violation object and stably traveling to a target lane, when a moving violation situation occurs at an intersection during autonomous driving and a method for generating a route thereof.

According to an embodiment of the present disclosure, an autonomous driving control apparatus may include a memory storing high definition map information and a processor electrically connected with the memory. The processor may generate a grid map based on an intersection driving route included in the high definition map information based on that a moving object is detected on a driving route of a vehicle in an intersection, may determine a drivable area with regard to the moving object, and may generate the driving route based on the grid map in which the drivable area is reflected.

The grid map may include N longitudinal grid points obtained by sampling the intersection driving route at a first interval and M lateral grid points having a second interval in a lateral direction from the longitudinal grid points.

The first interval may be determined based on the second interval.

The second interval may be determined based on the overall width of the vehicle.

The processor may set a boundary of the drivable area on the grid map and may determine properties for each grid point with regard to the drivable area.

The processor may generate the driving route by using a grid point matched with a current location of the vehicle as a start point and using a grid point matched with a target point on the intersection driving route as an end point.

The processor may navigate a next drivable grid point with regard to heading of a route and a maximum curvature radius of the vehicle at a current grid point.

The processor may calculate a route fusion rate based on a current speed of the vehicle and a current steering angle of the vehicle and may generate a final driving route by fusing a driving route generated at a current frame with a driving route generated at a previous frame at the route fusion rate.

The processor may calculate a current lateral speed of the vehicle using a current speed of the vehicle and a current steering angle of the vehicle, may calculate a lateral distance movable per frame using the current lateral speed and a predetermined one-time calculation time, and may calculate the route fusion rate using the lateral distance movable per frame and a maximum distance between lateral grid points for each route point.

The processor may set a driving route generated at a previous frame to be used as the driving route in response to failing in navigating the driving route.

According to another embodiment of the present disclosure, a method for generating a route of an autonomous driving control apparatus may include generating a grid map based on an intersection driving route included high definition map information based on that a moving object is detected on a driving route of a vehicle in an intersection, determining a drivable area with regard to the moving object, and generating the driving route based on the grid map in which the drivable area is reflected.

The generating of the grid map may include sampling the intersection driving route at a first interval to generate N longitudinal grid points and generating M lateral grid points having a second interval in a lateral direction from the longitudinal grid points.

The first interval may be determined based on the second interval.

The second interval may be determined based on the overall width of the vehicle.

The determining of the drivable area may include setting a boundary of the drivable area on the grid map and determining properties for each grid point with regard to the drivable area.

The generating of the driving route may include generating the driving route by using a grid point matched with a current location of the vehicle as a start point and using a grid point matched with a target point on the intersection driving route as an end point.

The generating of the driving route may include navigating a next drivable grid point with regard to heading of a route and a maximum curvature radius of the vehicle at a current grid point.

The generating of the driving route may include calculating a route fusion rate based on a current speed of the vehicle and a current steering angle of the vehicle and generating a final driving route by fusing a driving route generated at a current frame with a driving route generated at a previous frame at the route fusion rate.

The calculating of the route fusion rate may include calculating a current lateral speed of the vehicle using the current speed of the vehicle and the current steering angle of the vehicle, calculating a lateral distance movable per frame using the current lateral speed and a predetermined one-time calculation time, and calculating the route fusion rate using the lateral distance movable per frame and a maximum distance between lateral grid points for each route point.

The generating of the driving route may include setting a driving route generated at a previous frame to be used as the driving route in response to failing in navigating the driving route.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
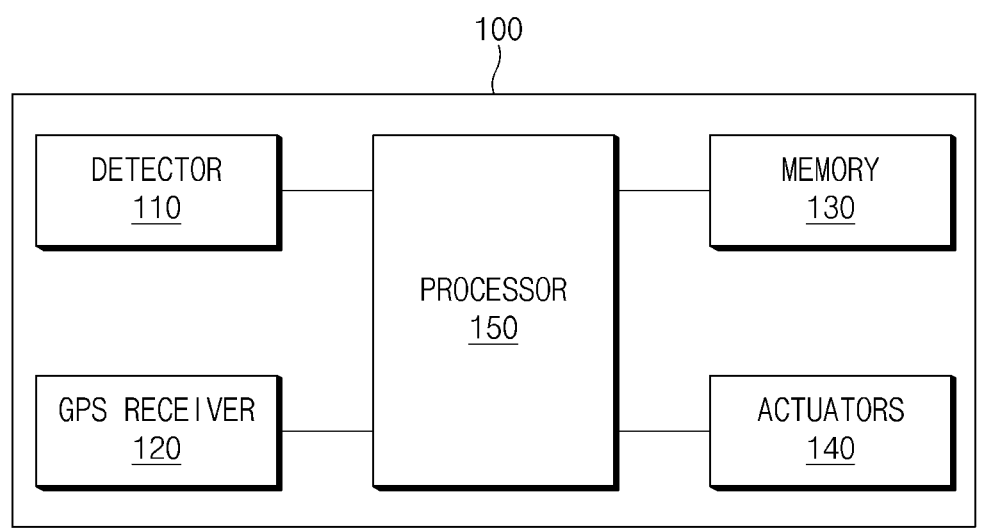
FIG. 1 is a block diagram illustrating a configuration of an autonomous driving control apparatus according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Moving violation (or tailgating) in the specification refers to a situation where a vehicle follows a preceding vehicle without stopping at the stop line while traffic is blocked at an intersection or when the traffic signal is changed at the intersection.

FIG. 1 is a block diagram illustrating a configuration of an autonomous driving control apparatus according to embodiments of the present disclosure.

An autonomous driving control apparatus 100 may be mounted on a vehicle loaded with an autonomous driving function. The autonomous driving control apparatus 100 may include a detector 110, a global positioning system (GPS) receiver 120, a memory 130, actuators 140, and a processor 150.

The detector 110 may obtain information about an object (e.g., another vehicle, a pedestrian, and the like) located around the vehicle. The detector 110 may detect object information by means of a camera, a radio detecting and ranging (radar), a light detection and ranging (LiDAR), and/or the like. The object information may include an object type, an object location, an object movement speed, and/or the like.

The detector 110 may obtain vehicle behavior information using a wheel speed sensor, a steering angle sensor, an inertial measurement unit (IMU), and/or the like. The vehicle behavior information may include a vehicle speed, a vehicle attitude, and/or the like.

The GPS receiver 120 may receive a signal transmitted from a satellite and may calculate a current location of the vehicle using the received signal. The GPS receiver 120 may calculate a distance between the satellite and the GPS receiver 120 using a time difference between a time when the satellite transmits a signal and a time when the GPS receiver 120 receives the signal. The GPS receiver 120 may calculate the current location of the vehicle using the calculated distance between the satellite and the GPS receiver 120 and location information of the satellite, which is included in the transmitted signal. At this time, the GPS receiver 120 may calculate the current location using triangulation.

The memory 130 may store high definition map information. The high definition map information may be updated by high definition map data received in real time through a communication device (not shown) such as a transceiver. The memory 130 may store a grid map generation algorithm based on an intersection driving route included in high definition map information, a drivable area selection algorithm considering an intersection moving violation object (e.g. a moving object located on a driving route of the vehicle in the intersection), an algorithm for setting (or making) a drivable area on a grid map, and a grid map-based route generation algorithm.

The memory 130 may be a non-transitory storage medium which stores instructions executed by the processor 150. The memory 130 may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM).

The actuators 140 may control a behavior (e.g., acceleration, deceleration, braking, shift, and/or the like) of the vehicle under an instruction of the processor 150. The actuators 140 may include an acceleration actuator, a braking actuator, a shift actuator, a suspension actuator, and/or the like.

The processor 150 may be electrically connected with the detector 110, the GPS receiver 120, the memory 130, and the actuators 140. The processor 150 may control the overall operation of the autonomous driving control apparatus 100. The processor 150 may include at least one of processing devices such as an application specific integrated circuit (ASIC), a digital signal processor (DSP), a programmable logic device (PLD), a field programmable gate array (FPGA), a central processing unit (CPU), a microcontroller, or a microprocessor.

The processor 150 may set a destination depending on a user input received from a user interface (e.g., a touch screen, a microphone, a keyboard, and/or the like). When the destination is set, the processor 150 may generate a driving route from a current location of the vehicle or a predetermined starting point to the destination. The processor 150 may control the actuators 140 such that the vehicle performs autonomous driving along the driving route.

When a moving violation event (or a moving violation situation) occurs in left turn and straight sections at the intersection during autonomous driving, the processor 150 may generate a driving route for avoiding the moving violation event. When a situation where it is difficult for the vehicle to travel at the intersection due to intersection moving violation vehicles (or moving objects violating the traffic signal at the intersection) is detected, the processor 150 may generate a driving route (or an avoidance route) where the vehicle may avoid the intersection moving violation vehicles to travel.

The processor 150 may obtain object information in real time using the detector 110. The processor 150 may detect (or recognize) an intersection moving violation event based on the obtained object information. For example, the processor 150 may determine whether a moving violation event occurs at the intersection based on signal information of traffic lights, location information of another vehicle in the intersection, and the like.

When the intersection moving violation event (or a moving object violating the traffic signal at the intersection) is detected, the processor 150 may generate a grid map on a geographic coordinate system based on an intersection driving route (or a route where the vehicle travels at the intersection), which is included in the high definition map information, depending on the grid map generation algorithm. As such, the processor 150 may generate a route optimized for traffic flow when generating a route based on the grid map by generating the grid map based on the intersection driving route included in the high definition map information.

The processor 150 may sample the intersection driving route included in the high definition map information at a predetermined first interval to generate N longitudinal grid points. The processor 150 may sample the intersection driving route included in the high definition map information at a predetermined second interval in a lateral direction from the longitudinal grid points to generate M lateral grid points. The first interval may be a distance between grid points in a longitudinal direction, which may be set to a predetermined multiple (e.g. twice) of the second interval. The second interval may be a distance between grid points in the lateral direction, which may be determined based on the overall width of the vehicle. As in an embodiment, the processor 150 may set the ratio of the first interval to the second interval, that is, a grid aspect ratio to 2:1, thus alleviating a curvature of the route generated based on the grid map.

The processor 150 may determine a drivable area with regard to an intersection size and an object (e.g., another vehicle) associated with the moving violation event. The processor 150 may determine a right boundary and a left boundary of the drivable area. The processor 150 may set (or mark) the determined drivable area on the grid map. In other words, the processor 150 may set the right boundary and the left boundary of the drivable area on the grid map. The processor 150 may determine properties for each grid point with regard to the drivable area. The properties for each grid point may be classified into a drivable grid point, an undrivable grid point, a grid point which is drivable, but is close to a boundary, and a grid point selected as a route.

The processor 150 may generate a driving route (or an avoidance route) based on the grid map in which the drivable area is reflected. The processor 150 may set a route search start point to a grid point where the vehicle is located and may set a route search end point to a grid point at a location where a lane that the vehicle should exit from the intersection and should enter starts (or a target point on the intersection driving route). The processor 150 may navigate a next drivable grid point with regard to heading (or the direction of progress) of the route and a maximum curvature radius of the vehicle at the current grid point.

When there is no next drivable longitudinal grid point at the current grid point, when the intersection driving route target point is not a drivable grid point, or when the vehicle does not reach a target point within the maximum number of times that the grid route is navigated, the processor 150 may fail in navigating the route. Herein, the maximum number of times that the grid route is navigated may be defined as N×(M×2).

When failing in navigating the route, the processor 150 may take a predetermined action. As an example, the processor 150 may set the driving route (or the avoidance route) generated at the previous frame to be used as the driving route when failing in navigating the route. As another example, the processor 150 may set the driving route generated at the previous frame to be used as the driving route without navigating the route any longer when the vehicle passes through an N-1th grid point, when failing in navigating the route.

The processor 150 may update the driving route in real time using a previous frame route (or a driving route generated at the previous frame) and a current frame route (or a driving route generated at the current frame). At this time, the processor 150 may fuse the previous frame route with the current frame route at a route fusion rate.

The processor 150 may calculate the route fusion rate. First of all, the processor 150 may calculate a current lateral speed Vlat using a current speed V of the vehicle and a current steering angle SA of the vehicle. The current lateral speed Vlat may be represented as Equation 1 below.

$$V_{lat}=V\times\sin(SA) \qquad \text{[Equation 1]}$$

The processor 150 may calculate a lateral distance movable during a predetermined one-time calculation time (or frame) using the current lateral speed and the one-time calculation time.

The processor 150 may calculate a maximum change distance for each route point. Herein, the maximum change distance may be defined as a maximum distance between lateral grid points.

The processor 150 may calculate a route fusion rate using a length between the lateral distance movable during the calculated one-time calculation time and the maximum change distance for each route point.

The processor 150 may fuse the driving route generated at the previous frame with the driving route generated at the current frame at the calculated route fusion rate to generate a final driving route. The processor 150 may control the actuators 140 such that the vehicle travels along the final driving route.

Thereafter, the processor 150 may detect a moving object (or an object associated with the moving violation event) by means of the detector 110 every frame until the vehicle passes through (or exit from) the intersection and may repeatedly perform the generation of the driving route for avoiding the detected moving object and the route fusion.

Figure 2:
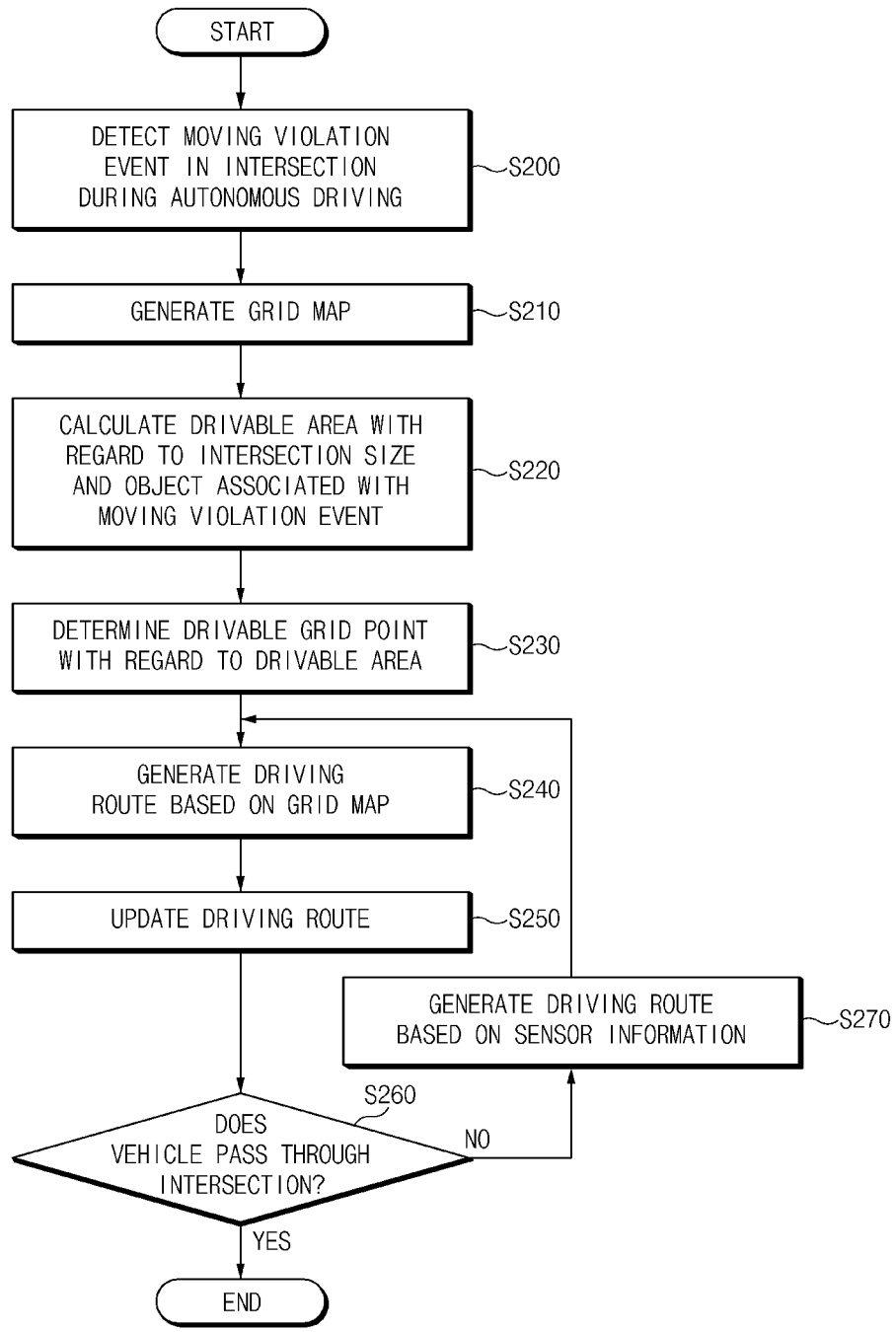
FIG. 2 is a flowchart illustrating a method for generating a route of an autonomous driving control apparatus according to embodiments of the present disclosure.

FIG. 2 is a flowchart illustrating a method for generating a route of an autonomous driving control apparatus according to embodiments of the present disclosure.

In S200, a processor 150 of an autonomous driving control apparatus 100 of FIG. 1 may detect an intersection moving violation event during autonomous driving. When there is an intersection in front of a vehicle on a driving route, the processor 150 may determine whether the moving violation event occurs at the intersection in front of the vehicle by means of the detector 110. As an example, when a moving object on a driving route of the vehicle in the intersection is detected, the processor 150 may determine that the moving violation event occurs.

When detecting the intersection moving violation event, in S210, the processor 150 may generate a grid map. When the moving violation event occurs at the intersection in front of the vehicle, the processor 150 may initiate to generate an avoidance route for avoiding the moving violation event. The processor 150 may generate a grid map based on an intersection driving route included in high definition map information. The processor 150 may generate N longitudinal grid points at a predetermined first interval along the intersection driving route. The processor 150 may generate M lateral grid points in a lateral direction from the longitudinal grid points. At this time, the processor 150 may generate lateral grid points at a predetermined second interval. The first interval may be a distance between grid points in a longitudinal direction, which may be set to twice the second interval. The second interval may be a distance between grid points in the lateral direction, which may be determined based on the overall width of the vehicle.

In S220, the processor 150 may calculate a drivable area with regard to an intersection size and a moving object. The processor 150 may determine a boundary of the drivable area in right and left directions of the vehicle with respect to the direction of progress of the vehicle. Furthermore, the processor 150 may additionally consider the overall width of the vehicle to calculate the drivable area. The processor 150 may set a right boundary and a left boundary of the calculated drivable area on the grid map.

In S230, the processor 150 may determine a drivable grid point with regard to the calculated drivable area. The processor 150 may determine properties for each grid point with regard to the drivable area. The properties for each grid point may be classified into a drivable grid point, an undrivable grid point, a grid point which is drivable, but is close to a boundary, and a grid point selected as a route.

In S240, the processor 150 may generate a driving route based on the grid map where the drivable area is set. In other words, the processor 150 may generate an avoidance route capable of avoiding the moving violation event based on the grid map in which the drivable area is reflected. The processor 150 may generate the driving route which uses a grid point where the vehicle is located as a start point and uses a grid point matched with a location where the vehicle exits from the intersection as an end point. The processor 150 may detect a moving object (e.g., another vehicle) using the detector 110 and may generate the driving route with regard to the detected moving object.

In S250, the processor 150 may perform a driving route update using the generated route. When there is a driving route generated at a previous frame, the processor 150 may fuse the driving route generated at the previous frame with the driving route generated at the current frame to generate a final driving route. The processor 150 may update the generated final driving route to the driving route. Herein, the frame may refer to a calculation index.

In S260, the processor 150 may determine whether the vehicle passes through the intersection after performing the route update. When it is determined that the vehicle passes through the intersection, the processor 150 may stop generating the driving route (or generating an avoidance driving route or generating an intersection driving route). As an example, when the vehicle reaches a grid point matched with an intersection exit point, the processor 150 may stop generating (or navigating) the driving route. As another example, when the vehicle reaches an N-1th grid point among the N longitudinal grid points, the processor 150 may stop generating the driving route.

Meanwhile, when it is determined that the vehicle does not pass through the intersection, in S270, the processor 150 may generate the driving route based on sensor information. Next, the processor 150 may repeatedly perform the operations from S240.

Figure 3:
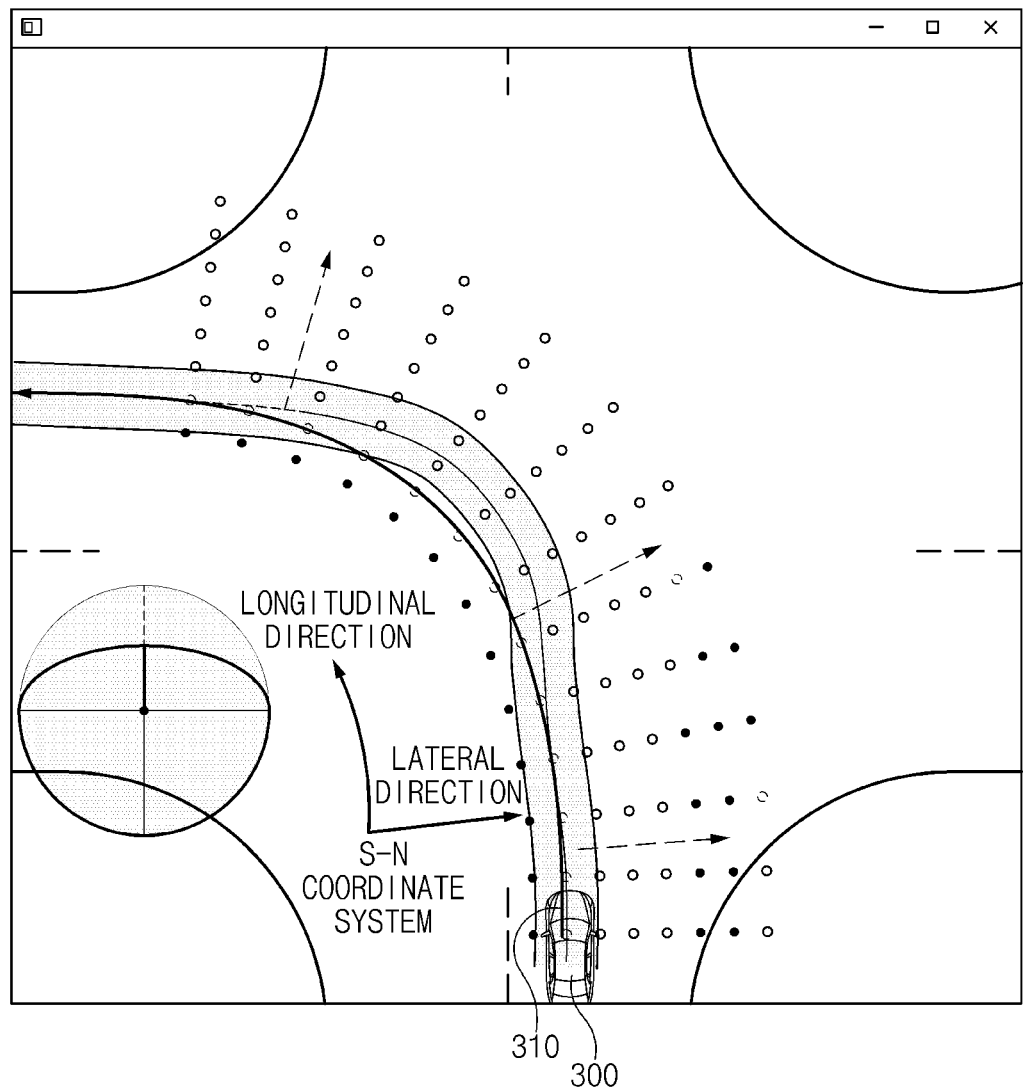
FIG. 3 is a drawing illustrating an example of generating a grid map according to embodiments of the present disclosure.

FIG. 3 is a drawing illustrating an example of generating a grid map according to embodiments of the present disclosure.

Referring to FIG. 3, a processor 150 of an autonomous driving control apparatus 100 of FIG. 1 may generate a grid map based on a shape of an intersection driving route included in high definition map information. The grid map may be generated on a south-north (S—N) coordinate system.

The processor 150 may generate N longitudinal grid points along a left turn route 310 in an intersection included in the high definition map information. At this time, the processor 150 may sample the left turn route 310 at a predetermined first interval to generate the N longitudinal grid points.

The processor 150 may generate M lateral grid points in a lateral direction from the longitudinal grid points. At this time, the processor 150 may sample the left turn route 310 at a predetermined second interval to generate the lateral grid points.

The first interval may be a distance between longitudinal grid points, which may be set to twice the second interval. The second interval may be a distance between lateral grid points, which may be determined based on the overall width of the vehicle.

As in the embodiment described above, the processor 150 may set an aspect ratio of the grid map to 2:1, thus alleviating a curvature of a grid map-based avoidance route. Furthermore, the processor 150 may generate a natural route with traffic flow when generating the avoidance route based on the grid map by generating the grid map based on the intersection driving route included in the high definition map information.

Figure 4:
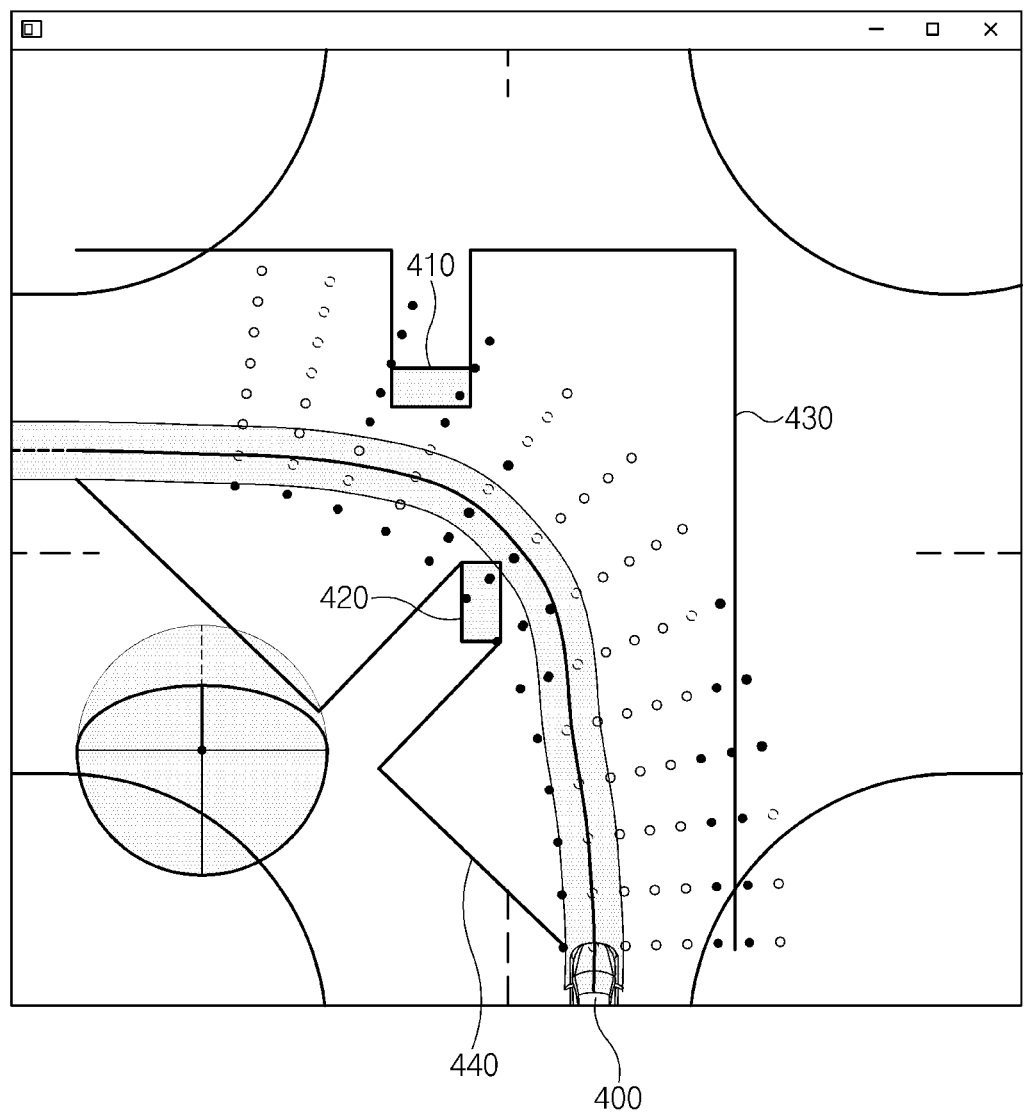
FIG. 4 is a drawing illustrating an example of calculating a drivable area according to embodiments of the present disclosure.

FIG. 4 is a drawing illustrating an example of calculating a drivable area according to embodiments of the present disclosure.

Referring to FIG. 4, when there are moving objects, that is, a first another vehicle 410 and a second another vehicle 420 in a situation where a vehicle 400 receives a left turn signal at an intersection in front of the vehicle 400 while the vehicle 400 performs autonomous driving, a processor 150 of an autonomous driving control apparatus 100 mounted on the vehicle 400 may determine a drivable area with regard to an intersection size and the moving objects. At this time, the processor 150 may additionally consider the overall width of the vehicle 400 to calculate the drivable area.

The processor 150 may determine a first boundary 430 of the drivable area with regard to the first other vehicle 410 which is present at the right of the vehicle 400 with respect to the direction of progress of the vehicle 400 Furthermore, the processor 150 may determine a second boundary 440 of the drivable area with regard to the second other vehicle 420 which is present at the left of the vehicle 400 with respect to the direction of progress of the vehicle 400

The processor 150 may set (or mark) the first boundary 430 and the second boundary 440 on a grid map. The processor 150 may determine properties for each grid point with regard to the drivable area. The properties for each grid point may be classified into a drivable grid point, an undrivable grid point, a grid point which is drivable, but is close to a boundary, and a grid point selected as a route.

Figure 5:
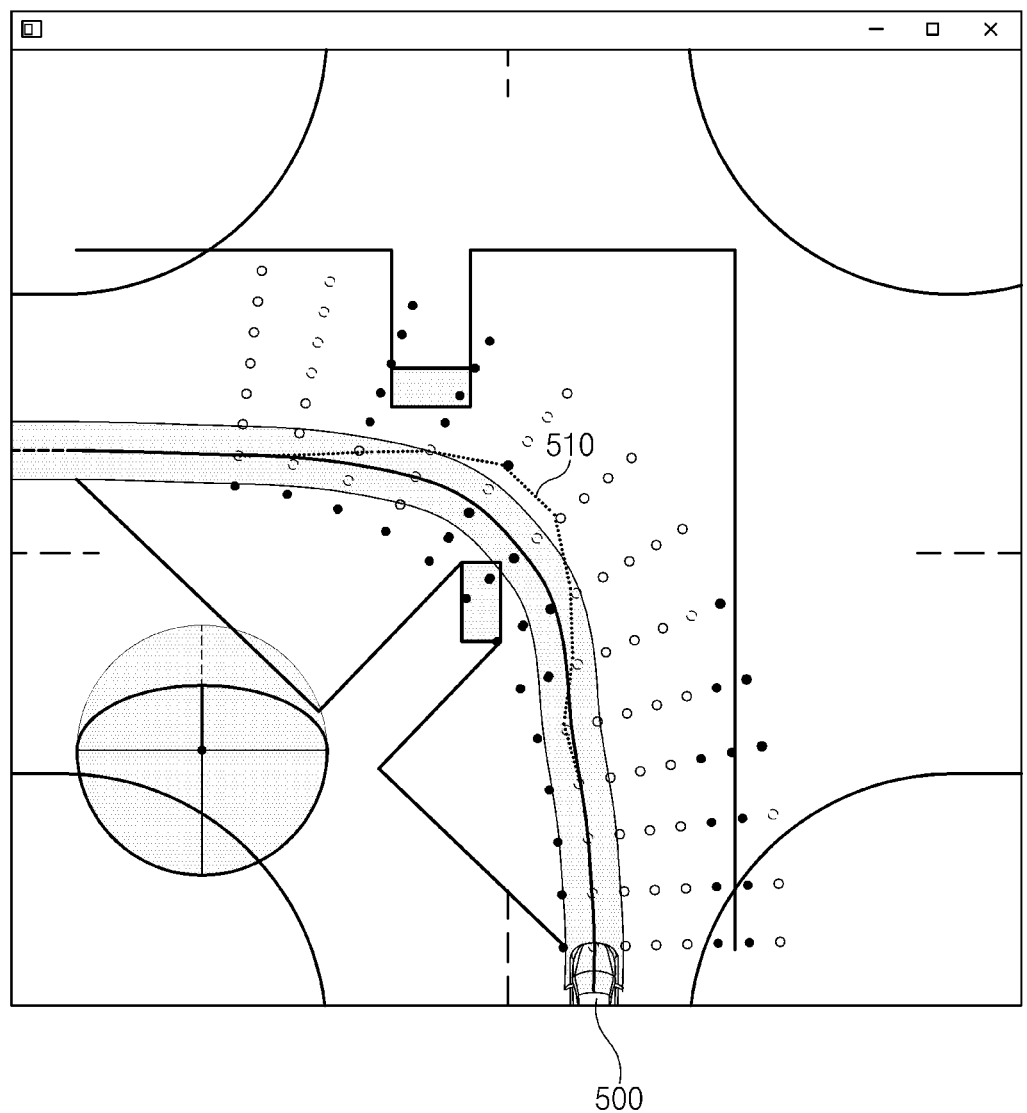
FIG. 5 is a drawing for describing a method of generating a driving route based on a grid map according to embodiments of the present disclosure.

FIG. 5 is a drawing for describing a method of generating a driving route based on a grid map according to embodiments of the present disclosure.

Referring to FIG. 5, a processor 150 of an autonomous driving control apparatus 100 of FIG. 1, which is loaded into a vehicle 500, may generate a driving route 510 for avoiding an intersection moving violation event based on a grid map on (or in) which a drivable area is marked (or reflected). The processor 150 may use a route search start point as a grid point matched with a current location of the vehicle 500 and may use a route search end point as a grid point matched with a location where a lane that the vehicle 500 should exit from the intersection and should enter starts (or a target point on an intersection driving route). The processor 150 may navigate a next drivable grid point with regard to heading (or the direction of progress) of the driving route 510 and a maximum curvature radius of the vehicle 500 at the current grid point.

When there is no next longitudinal grid point driving when considering the heading (or the direction of progress) of the vehicle 500 and the maximum curvature radius of the vehicle 500 at the current grid point matched with the current location of the vehicle 500, the processor 150 may fail in navigating the driving route. The next drivable longitudinal grid points at the current grid point, when considering the heading and maximum curvature radius of the vehicle 500, are grid points −1, 0, and +1 with respect to an index of the lateral grid point.

When the intersection driving route target point (i.e., a route search end point) is not a drivable grid point or does not reach a target point within the maximum number of times that the grid route is navigated, the processor 150 may fail in navigating the route. Herein, the maximum number of times that the grid route is navigated may be determined based on the number N of longitudinal grid points and the number M of lateral grid points. Herein, the maximum number of times that the grid route is navigated may be defined as N×(M×2).

When failing in navigating the route, the processor 150 may take a predetermined action. As an example, when failing in navigating the route, the processor 150 may use a previous frame route (i.e., a driving route generated in the operation of calculating a previous avoidance route). As another example, when the vehicle 500 passes through an N-1th grid point when failing in navigating the route, the processor 150 may not navigate the route any longer and may use the previous frame route as a driving route.

Figure 6:
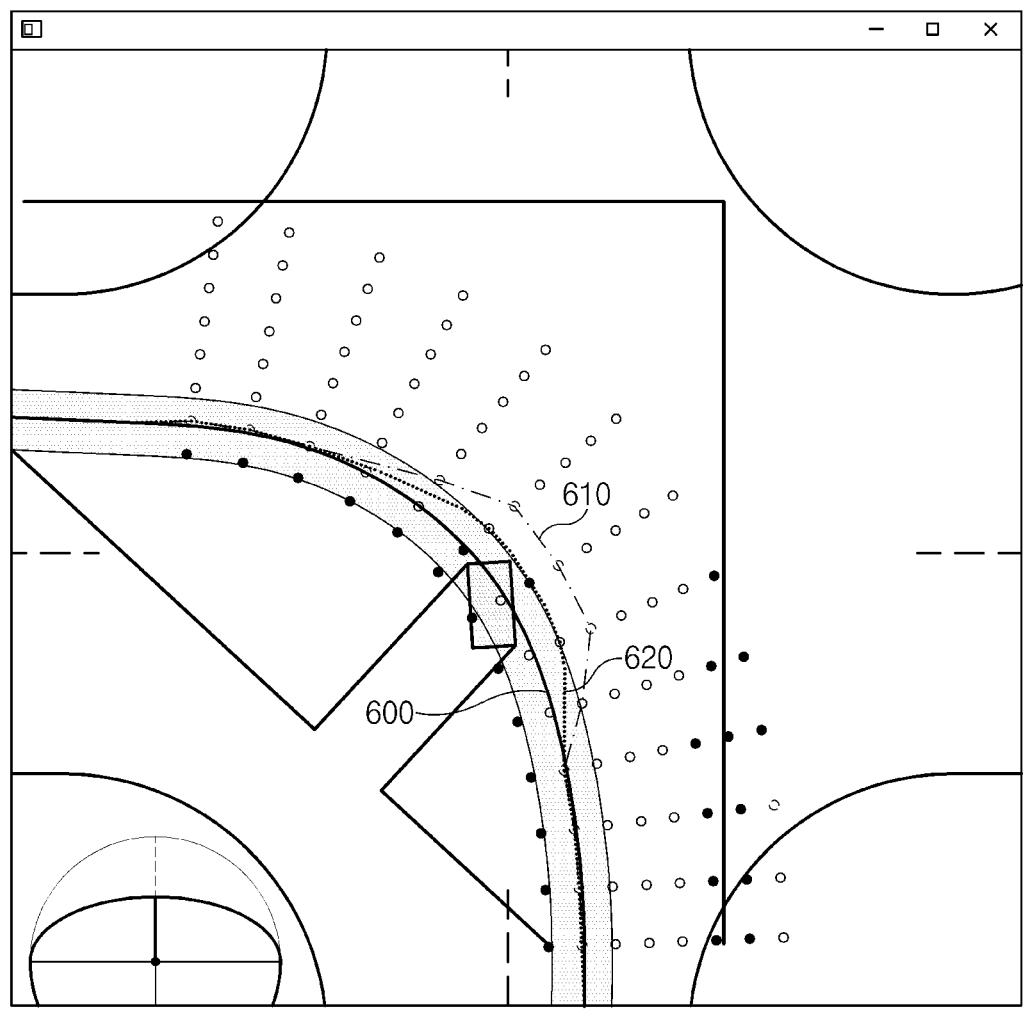
FIG. 6 is a drawing for describing route post-processing according to embodiments of the present disclosure.

FIG. 6 is a drawing for describing route post-processing according to embodiments of the present disclosure.

A processor 150 of an autonomous driving control apparatus 100 of FIG. 1 may generate an avoidance route in real time to update a driving route. The processor 150 may update the driving route using an avoidance route generated at a previous frame, that is, a previous frame route 600 and an avoidance route generated at a current frame, that is, a current frame route 610. At this time, the processor 150 may fuse the previous frame route 600 with the current frame route 610 at a route fusion rate to generate a final avoidance route 620.

The processor 150 may calculate the route fusion rate depending on the following procedure. First of all, the processor 150 may calculate a current lateral speed Vlat of the vehicle using a current speed V of the vehicle and a current steering angle SA of the vehicle depending on Equation 1 above. Next, the processor 150 may calculate a lateral distance during a one-time calculation time (e.g., 0.1 second) using the current lateral speed Vlat and the one-time calculation time (i.e., one frame). Then, the processor 150 may calculate a maximum distance between lateral grid points for each route point. Finally, the processor 150 may calculate the route fusion rate using the lateral distance movable during the one-time calculation time (or a lateral distance movable per frame) and the maximum distance between the lateral grid points for each route point.

FIGS. 7 to 11 are drawings illustrating an example of route post-processing according to embodiments of the present disclosure.

When the current speed of a vehicle Vego is 5 m/s and when the current steering angle of the vehicle Vego is 30 degrees, an autonomous driving control apparatus 100 of the vehicle Vego may calculate a lateral speed of 2.5 m/s (=5×sin (30)) of the vehicle Vego using the current speed and the current steering angle. The autonomous driving control 100 may calculate a lateral distance of 0.25 m movable during a predetermined one-time calculation time (or frame) (e.g., 0.1 second) based on the lateral speed of the vehicle Vego.

Figure 7:
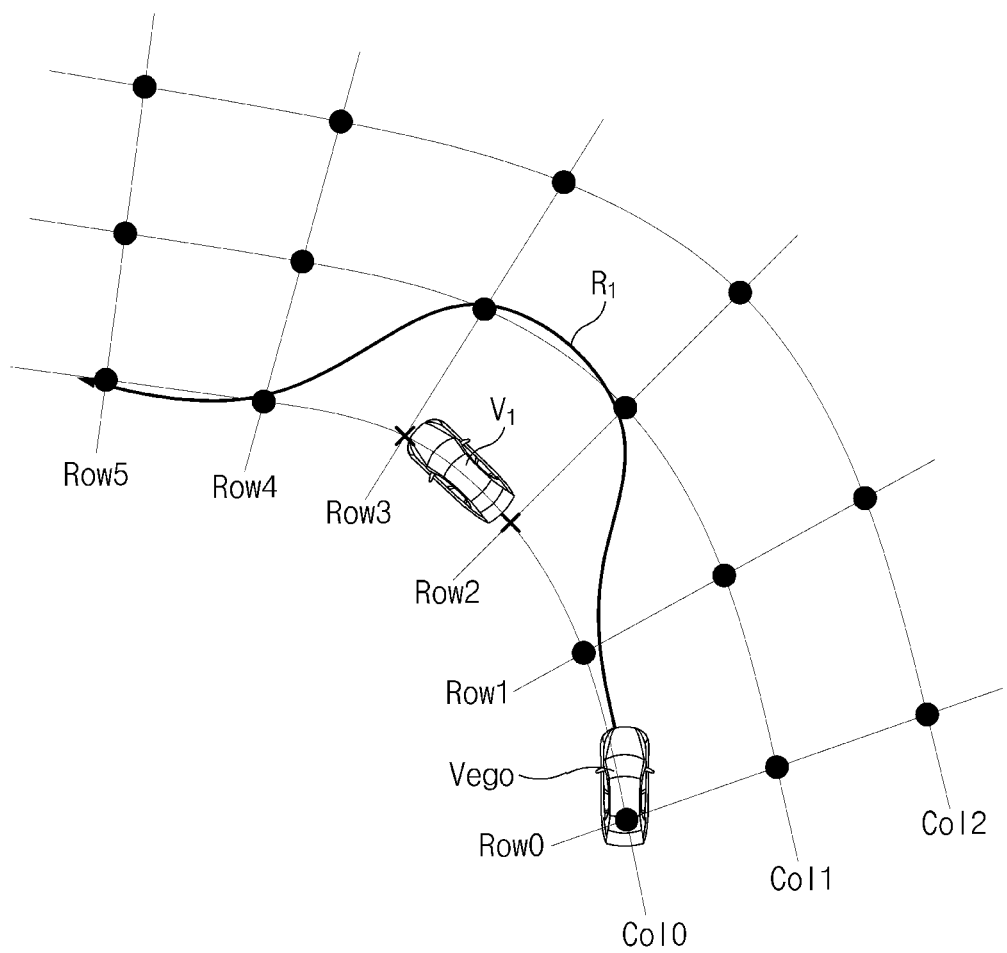
FIGS. 7, 8, 9, 10, and 11 are drawings illustrating an example of route post-processing according to embodiments of the present disclosure.

Referring to FIG. 7, at a first frame (or calculation index), the autonomous driving control apparatus 100 may detect a moving object, that is, a first another vehicle V1 by means of a detector 110 of FIG. 1. The autonomous driving control apparatus 100 may generate an initial moving object avoidance route, that is, a first avoidance route R1 with regard to the detected first other vehicle V1.

Figure 8:
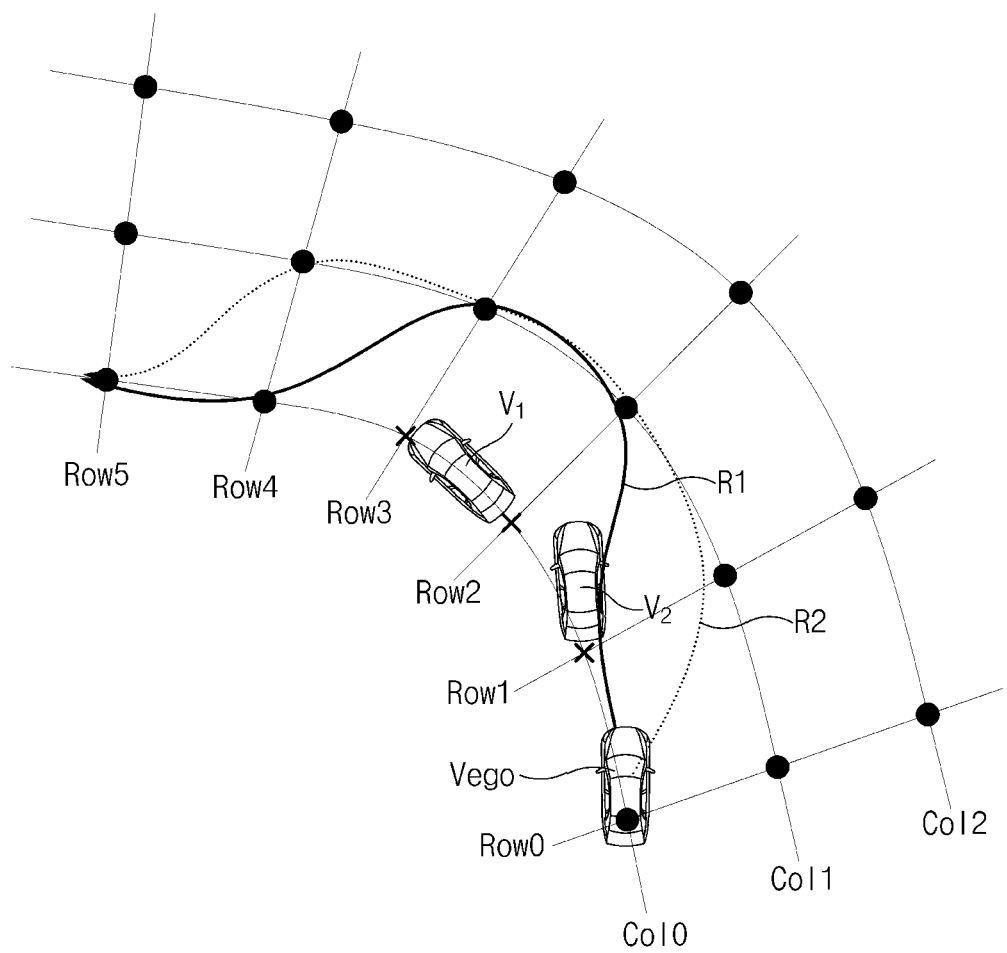

Referring to FIG. 8, at a second frame, when a first another vehicle V1 and a second another vehicle V2 are detected by the detector 110, the autonomous driving control apparatus 100 may generate a second avoidance route R2 for avoiding the first other vehicle V1 and the second other vehicle V2.

Figure 9:
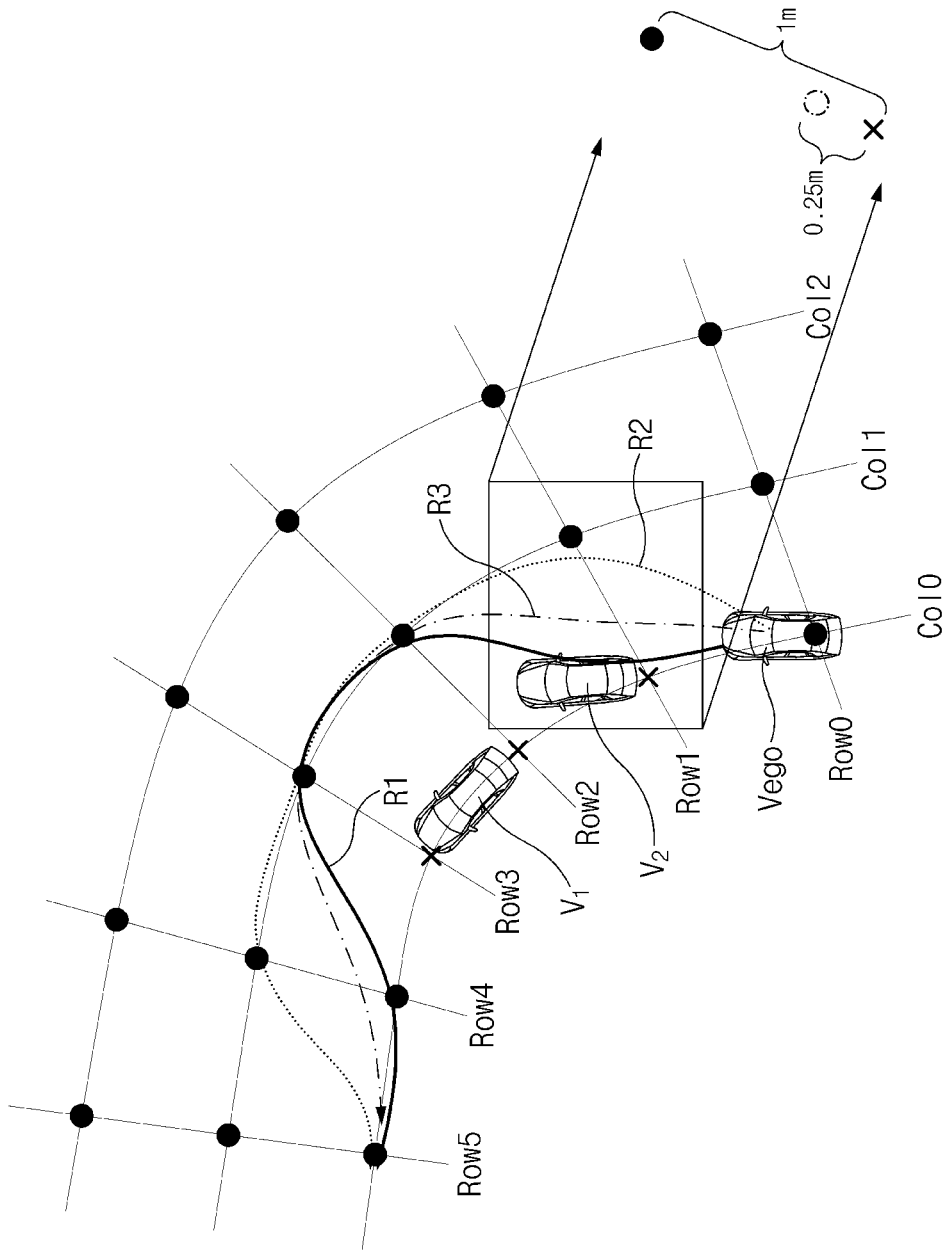

Referring to FIG. 9, the autonomous driving control apparatus 100 may fuse the first avoidance route R1 with the second avoidance route R2 at a predetermined fusion rate to generate a third avoidance route R3. The fusion rate may be determined by a lateral distance movable per frame and a maximum change distance among route points. For example, the autonomous driving control apparatus 100 may calculate the lateral distance movable per frame (i.e., a lateral distance movable during a one-time calculation time) by calculating a lateral speed using a current vehicle speed and a current steering angle. Furthermore, the autonomous driving control apparatus 100 may determine the maximum change distance among the route points as a distance between lateral grid points. When the lateral distance movable per frame is 0.25 m and when the distance between the lateral grid points is 1 m, the autonomous driving control apparatus 100 may calculate a fusion rate of 25% (=0.25 m/1 m×100).

Figure 10:
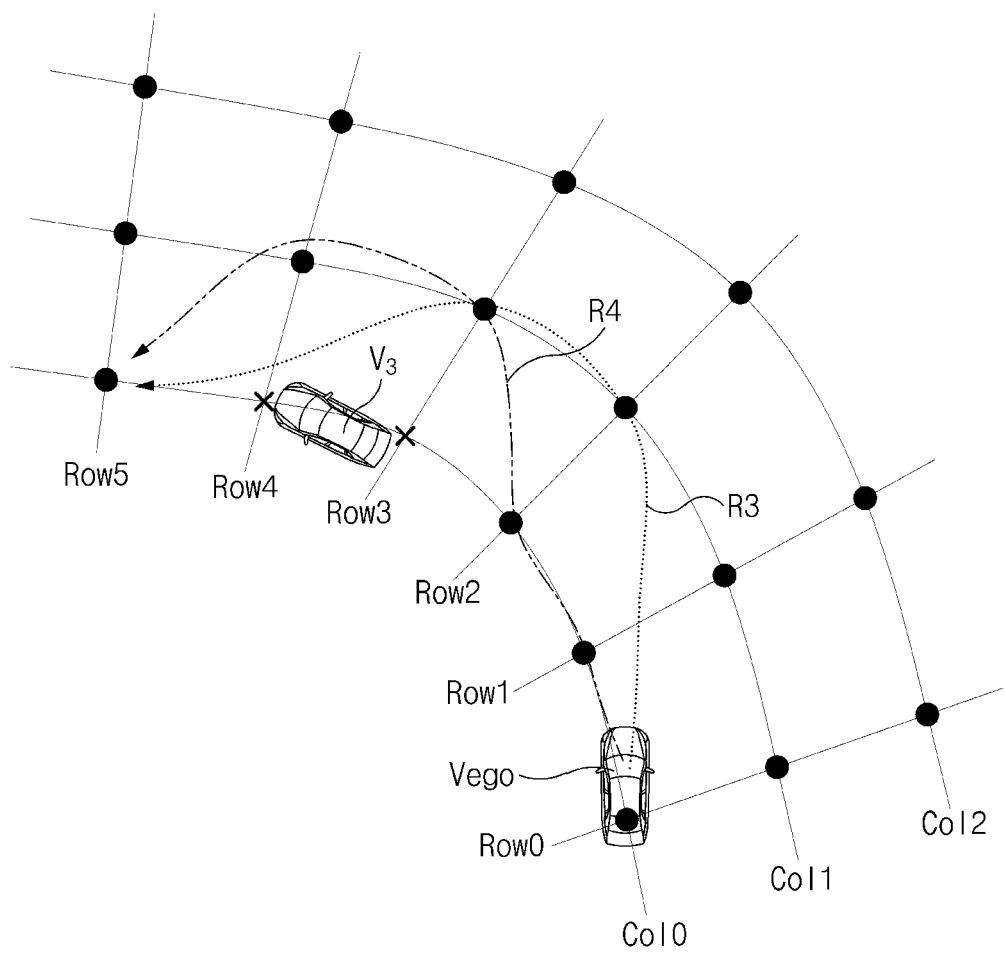

Referring to FIG. 10, at a third frame, the autonomous driving control apparatus 100 may detect a third another vehicle V3 by means of the detector 110 and may generate a fourth avoidance route R4 with regard to the third other vehicle V3.

Figure 11:
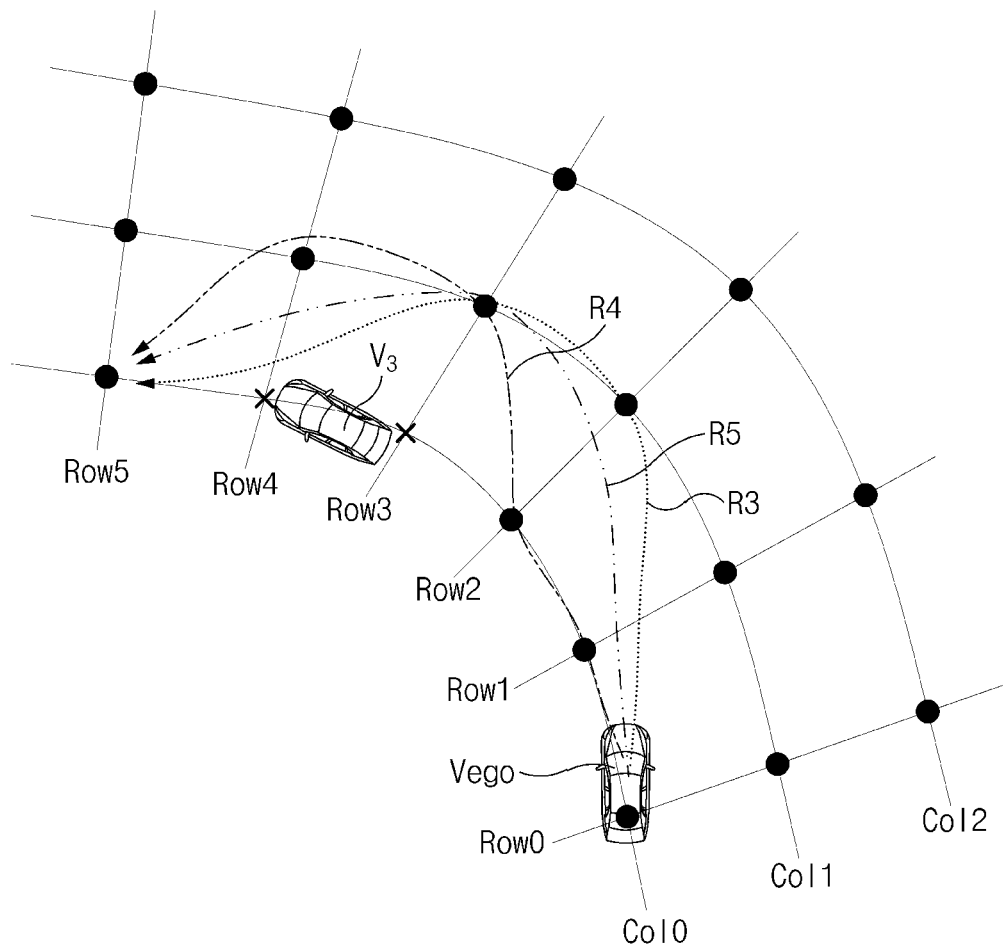

Referring to FIG. 11, the autonomous driving control apparatus 100 may fuse the third avoidance route R3 with the fourth avoidance route R4 to generate a fifth avoidance route R5.

Figure 12:
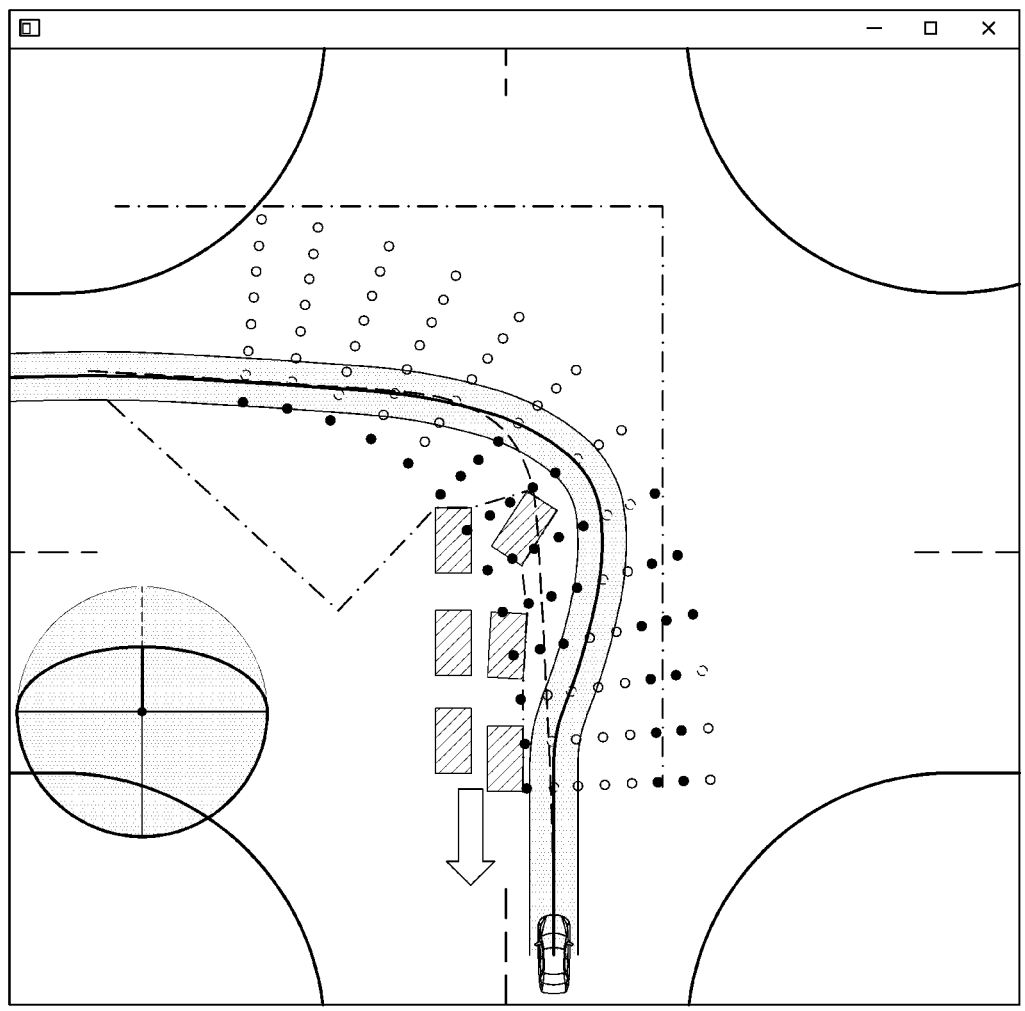
FIGS. 12 and 13 are drawings illustrating the result of generating a moving object avoidance route at a left turn section of an intersection according to embodiments of the present disclosure.
Figure 13:
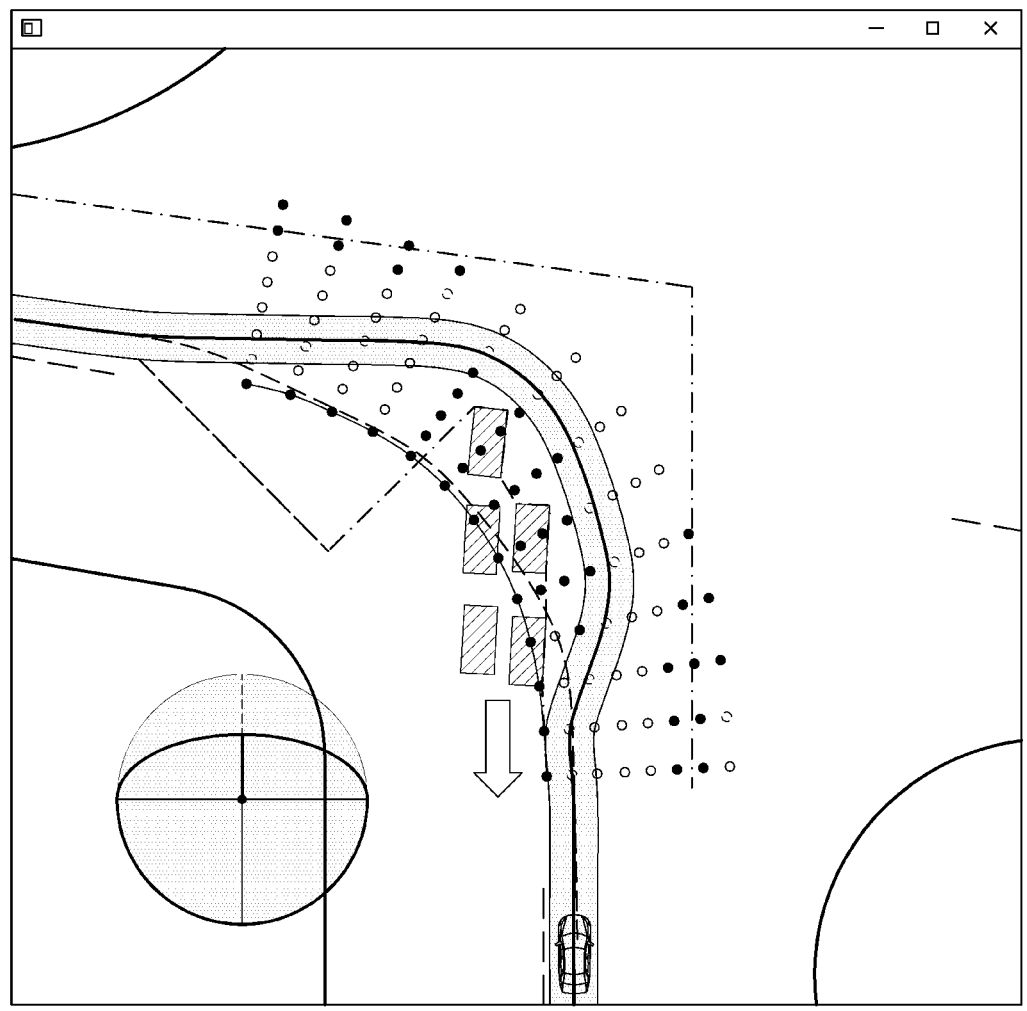

Thereafter, the autonomous driving control apparatus 100 may repeatedly perform route generation and route fusion every frame until the vehicle Vego exits from the intersection FIGS. 12 and 13 are drawings illustrating the result of generating a moving object avoidance route at a left turn section of an intersection according to embodiments of the present disclosure.

Referring to FIGS. 12 and 13, when it is impossible for a vehicle to travel along a driving route at an intersection based on a high definition map due to moving objects in a situation where the vehicle should make a left turn at the intersection in front of the vehicle during autonomous driving, an autonomous driving control apparatus 100 of FIG. 1 may generate an avoidance route for avoiding the moving objects. The autonomous driving control apparatus 100 may generate an avoidance route (or a driving route) with regard to the moving objects (or vehicles) located at a left turn section at the intersection.

Figure 14:
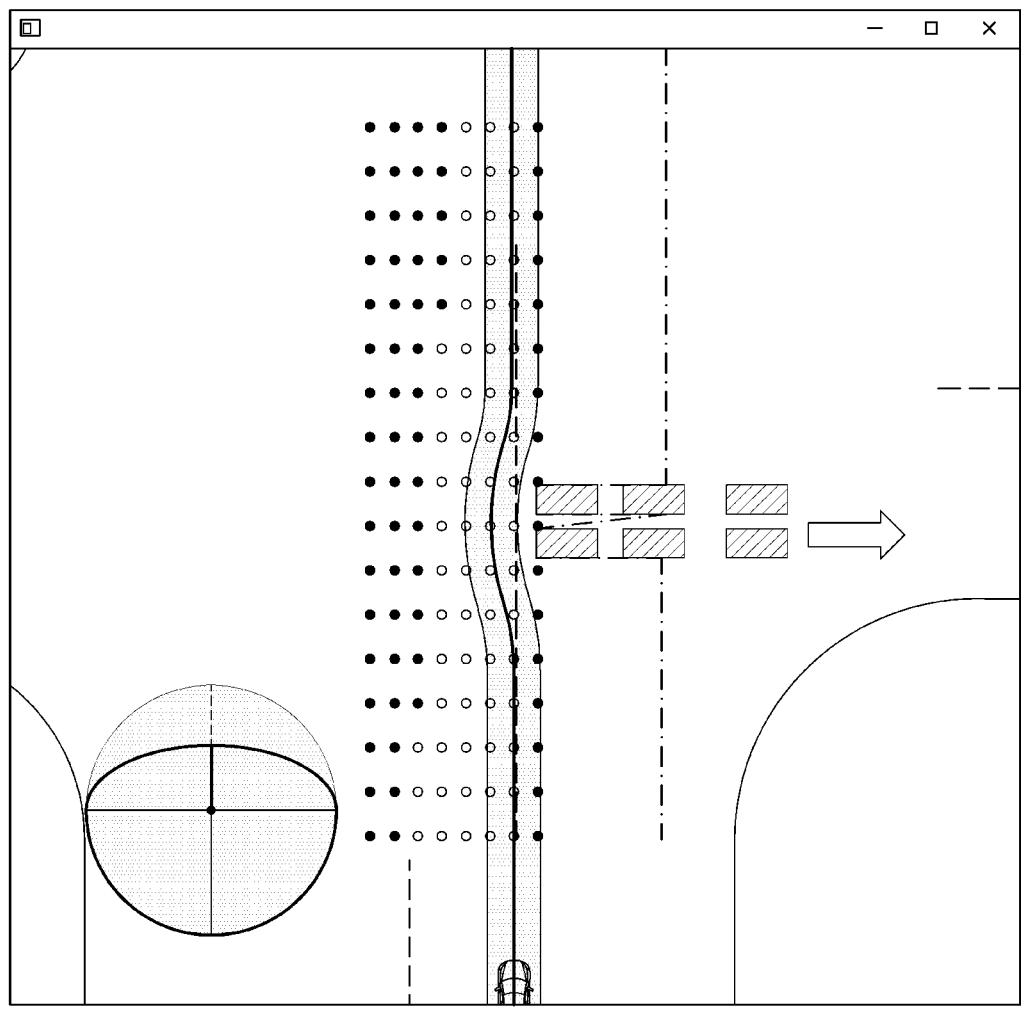
FIGS. 14 and 15 are drawings illustrating the result of generating a moving object avoidance route at a straight section of an intersection according to embodiments of the present disclosure.
Figure 15:
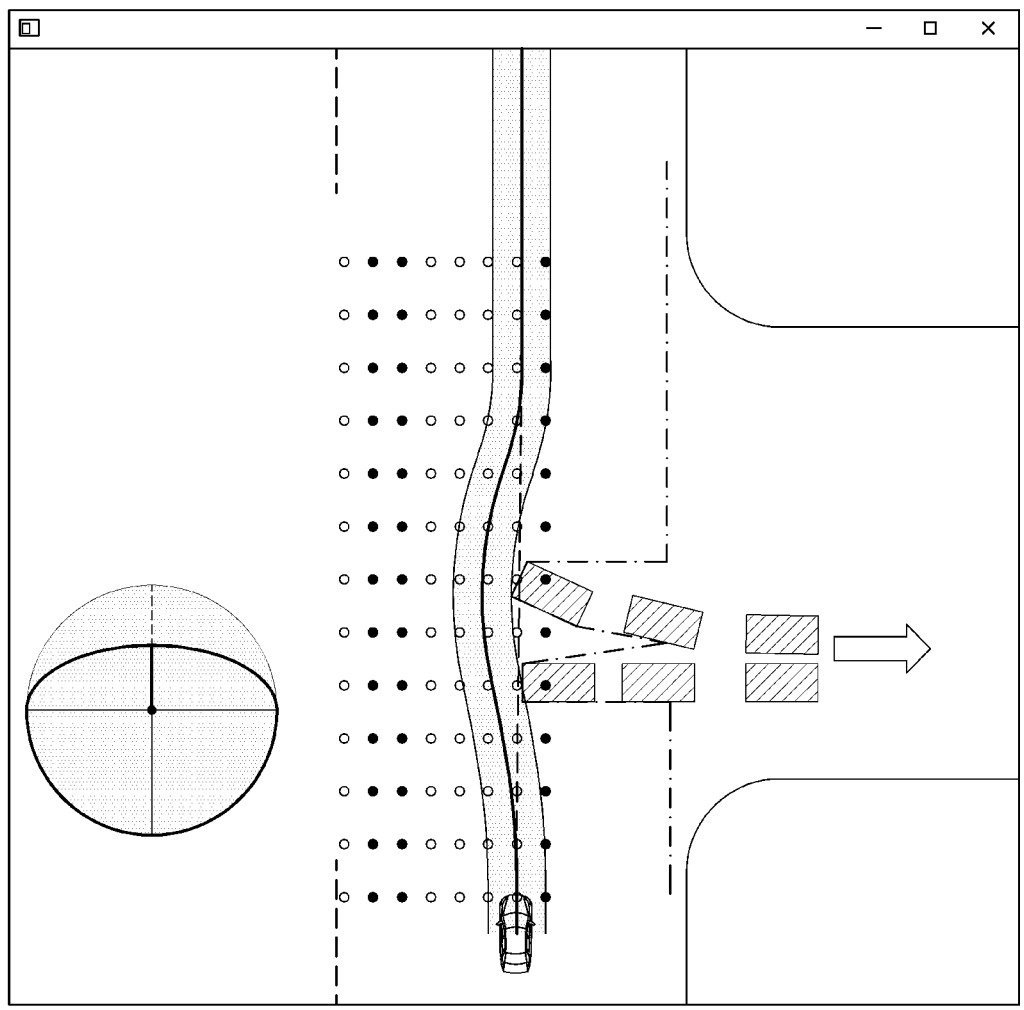

FIGS. 14 and 15 are drawings illustrating the result of generating a moving object avoidance route at a straight section of an intersection according to embodiments of the present disclosure.

Referring to FIGS. 14 and 15, when it is impossible for a vehicle to travel along a driving route at an intersection based on a high definition map due to moving objects in a situation where the vehicle should go straight at the intersection in front of the vehicle during autonomous driving, an autonomous driving control apparatus 100 of FIG. 1 may generate an avoidance route for avoiding the moving objects to go straight. The autonomous driving control apparatus 100 may generate an avoidance route with regard to the moving objects located at a straight section at the intersection.

Embodiments of the present disclosure, the autonomous driving control apparatus may generate a route for avoiding a moving object and stably traveling to a target lane, when a moving violation situation occurs at an intersection during autonomous driving, such that an autonomous vehicle may avoid the moving violation situation at the intersection in the downtown area, which is a heavy traffic situation, to travel to the destination.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An autonomous driving control apparatus for a vehicle, the autonomous driving control apparatus comprising:
   a memory configured to store high definition map information; and
   a processor electrically connected to the memory,
   wherein the processor is configured to:
      determine whether a moving violation event occurs at an intersection based on signal information of traffic lights and location information of another vehicle in the intersection;
      generate a grid map based on a first driving route in the intersection included in the high definition map information based on a detected moving object and on the first driving route of the vehicle;
      determine a drivable area with regard to the moving object; and
      generate a second driving route in the drivable area based on the grid map, and
   wherein the grid map comprises a plurality of grid points by sampling an intersection driving path at predetermined intervals; and
   wherein the processor is further configured to:
      calculate a current lateral speed of the vehicle using a current speed of the vehicle and a current steering angle of the vehicle;
      calculate a lateral distance movable per frame using the current lateral speed and a predetermined one-time calculation time;
      calculate a route fusion rate using the lateral distance movable per frame and a maximum distance between lateral grid points for each route point;
      generate a final driving route by fusing a driving route generated at a current frame with a driving route generated at a previous frame based on the route fusion rate;
      cause the vehicle to autonomously travel along the final driving route.

2. The autonomous driving control apparatus of claim 1, wherein the grid map includes N longitudinal grid points obtained by sampling the first driving route at a first interval and M lateral grid points having a second interval in a lateral direction from the longitudinal grid points.

3. The autonomous driving control apparatus of claim 2, wherein the first interval is determined based on the second interval.

4. The autonomous driving control apparatus of claim 2, wherein the second interval is based on an overall width of the vehicle.

5. The autonomous driving control apparatus of claim 1, wherein the processor is configured to:
   set a boundary of the drivable area on the grid map; and
   determine properties for each grid point with regard to the drivable area.

6. The autonomous driving control apparatus of claim 1, wherein the processor is configured to generate the second driving route by:
   using a grid point matched with a current location of the vehicle as a start point; and
   using a grid point matched with a target point on the first driving route as an end point.

7. The autonomous driving control apparatus of claim 1, wherein the processor is configured to navigate a next drivable grid point with regard to heading of a route and a maximum curvature radius of the vehicle at a current grid point.

8. The autonomous driving control apparatus of claim 1, wherein the processor is configured to set a driving route generated at a previous frame to be used as the driving route in response to failing in navigating the driving route.

9. A method for generating a route of an autonomous driving control apparatus, the method comprising:
  determining, by a processor, whether a moving violation event occurs at an intersection based on signal information of traffic lights and location information of another vehicle in the intersection;
  generating, by the processor, a grid map based on a first driving route in the intersection included in high definition map information based on a detected moving object and on the first driving route of a vehicle, wherein the grid map comprises a grid point by sampling an intersection driving path at a certain interval;
  determining, by the processor, a drivable area with regard to the moving object; and
  generating, by the processor, a second driving route in the drivable area based on the grid map, wherein generating the second driving route comprises:
    calculating, by the processor, a current lateral speed of the vehicle using a current speed of the vehicle and a current steering angle of the vehicle;
    calculating, by the processor, a lateral distance movable per frame using the current lateral speed and a predetermined one-time calculation time;
    calculating, by the processor, a route fusion rate using the lateral distance movable per frame and a maximum distance between lateral grid points for each route point;
    generating, by the processor, a final driving route by fusing a driving route generated at a current frame with a driving route generated at a previous frame at the route fusion rate; and
  causing, by the processor, the vehicle to autonomously travel along the final driving route.

10. The method of claim 9, wherein generating the second driving route comprises setting a driving route generated at a previous frame to be used as the driving route in response to failing in navigating the driving route.

11. A method for autonomously operating a vehicle, the method comprising:
  determining whether a moving violation event occurs at an intersection based on signal information of traffic lights and location information of another vehicle in the intersection;
  generating a grid map based on a first driving route in the intersection included in high definition map information based on a detected moving object and on the first driving route of the vehicle, wherein the grid map comprises a certain grid point by sampling an intersection driving path at a certain interval;
  determining a drivable area with regard to the moving object;
  generating a second driving route in the drivable area based on the grid map, wherein generating the second driving route comprises:
    calculating a current lateral speed of the vehicle using a current speed of the vehicle and a current steering angle of the vehicle;
    calculating a lateral distance movable per frame using the current lateral speed and a predetermined one-time calculation time;
    calculating a route fusion rate using the lateral distance movable per frame and a maximum distance between lateral grid points for each route point; and
    generating a final driving route by fusing a driving route generated at a current frame with a driving route generated at a previous frame at the route fusion rate; and
  causing the vehicle to autonomously travel along the final driving route.

12. The method of claim 11, wherein generating the grid map comprises:
  sampling the first driving route at a first interval to generate N longitudinal grid points; and
  generating M lateral grid points having a second interval in a lateral direction from the longitudinal grid points.

13. The method of claim 12, wherein the first interval is determined based on the second interval.

14. The method of claim 12, wherein the second interval is based on an overall width of the vehicle.

15. The method of claim 11, wherein determining the drivable area comprises:
  setting a boundary of the drivable area on the grid map; and
  determining properties for each grid point with regard to the drivable area.

16. The method of claim 11, wherein generating the second driving route comprises generating the second driving route by using a grid point matched with a current location of the vehicle as a start point and using a grid point matched with a target point on the first driving route as an end point.

17. The method of claim 11, wherein generating the second driving route comprises navigating a next drivable grid point with regard to heading of a route and a maximum curvature radius of the vehicle at a current grid point.

* * * * *